(12) United States Patent
Hedrick

(10) Patent No.: US 6,462,703 B2
(45) Date of Patent: Oct. 8, 2002

(54) METHOD AND SYSTEM FOR HIGH PRECISION ALTITUDE MEASUREMENT OVER HOSTILE TERRAIN

(75) Inventor: Geoffrey S. M. Hedrick, Malvern, PA (US)

(73) Assignee: Innovative Solutions & Support, Inc., Exton, PA (US)

(*) Notice: Subject to any disclaimer, the term of this patent is extended or adjusted under 35 U.S.C. 154(b) by 0 days.

(21) Appl. No.: 09/916,897

(22) Filed: Jul. 27, 2001

(65) Prior Publication Data
US 2002/0126041 A1 Sep. 12, 2002

Related U.S. Application Data
(60) Provisional application No. 60/221,113, filed on Jul. 27, 2000.

(51) Int. Cl.$^7$ .............................................. G01S 13/08
(52) U.S. Cl. ...................... 342/120; 342/165; 342/173; 342/195; 342/357.06; 73/384; 340/977
(58) Field of Search .................... 342/118, 120, 342/121, 122, 123, 124, 175, 195, 357.01–357.17, 63, 165, 169, 170, 171, 172, 173, 174; 701/207, 213, 301, 214, 215, 216; 340/970, 977, 870.01; 73/178 R, 384, 385, 386, 387

(56) References Cited

U.S. PATENT DOCUMENTS

| | | | | | |
|---|---|---|---|---|---|
| 3,595,077 A | * | 7/1971 | Perkins | ...................... | 73/178 R |
| 3,715,718 A | * | 2/1973 | Astengo | ...................... | 340/970 |
| 3,936,797 A | * | 2/1976 | Andresen, Jr. | .............. | 340/977 |
| 4,253,335 A | * | 3/1981 | Shimomura | .................. | 73/384 |
| 4,431,994 A | * | 2/1984 | Gemin | ........................ | 340/970 |
| 5,345,241 A | * | 9/1994 | Huddle | ........................ | 342/120 |
| 5,402,116 A | * | 3/1995 | Ashley | ...................... | 340/870.1 |
| 6,157,891 A | * | 12/2000 | Lin | ............................. | 701/301 |

* cited by examiner

Primary Examiner—Bernarr E. Gregory
(74) Attorney, Agent, or Firm—Cohen, Pontani, Lieberman & Pavane

(57) ABSTRACT

A system and method for providing highly accurate measurements of the altitude above ground level (AGL) of an aircraft flying over local terrain. A current AGL altitude of the aircraft over local terrain is obtained by activating a radar altimeter on the aircraft for a single short duration or pulse. A mean sea level (MSL) elevation of the local terrain is determined by identifying the terrain from the then-current aircraft geographical position coordinates and utilizing known terrain topography data. The actual MSL altitude of the aircraft can then be determined. An uncorrected MSL altitude of the aircraft is then determined from conventional static air pressure measurements and the difference between the actual MSL altitude and the uncorrected MSL altitude of the aircraft yields a local barometric correction factor for use in determining MSL altitude measurements of the aircraft as the aircraft flies over and continues its flight away from the local terrain.

19 Claims, 2 Drawing Sheets

METHOD AND SYSTEM FOR HIGH PRECISION ALTITUDE MEASUREMENT OVER HOSTILE TERRAIN

This application claims the benefit of provisional application No. 60/221,113 filed Jul. 27, 2000.

BACKGROUND OF THE INVENTION

1. Field of the Invention

This invention relates to the field of altitude measurement and, more particularly, to high precision altitude measurement for use by aircraft.

2. Description of the Related Art

For obvious reasons, it is important to accurately know, at all times, the altitude of an aircraft in flight. The importance is raised by an order of magnitude in the field of military aircraft, where the altitude may need to be measured and known to very strict tolerances under hostile conditions. Military aircraft often travel surreptitiously, and have special needs for highly accurate measurements of their current altitude above ground level ("AGL").

Conventionally, when measuring AGL altitude, aircraft use radar altimeter readings which are detectable and, hence, carry significant risk in hostile territory. Radar altimeters operate by emitting a radar beam, either continuous or pulsed at close time intervals. The beam is directed from the in-flight aircraft toward underlying local terrain (i.e. toward terrain proximate the aircraft current position), and the duration of the period from broadcast of the beam to reception of the reflected return signal is used to determine the AGL altitude. However, enemy ground monitors may detect the radar altimeter beam and initiate anti-aircraft measures to intercept and destroy the aircraft. Thus, the use of constant or substantially constant radar emissions for determining current aircraft altitude must be avoided.

It is of course known to measure altitude above mean sea level ("MSL") as a function of static air pressure detected on the exterior of the aircraft. This technique is commonly employed in commercial and general aviation as the primary means of determining altitude. However, this method does not measure AGL altitude, so the combat pilot is still left with an unknown error correction representing the height of the aircraft above the terrain, and/or other obstacles (e.g. buildings).

There is yet another problem with relying on static air pressure as a determinant of the AGL altitude of the aircraft. Air pressure varies not only as a function of the MSL altitude of the aircraft, but also with the local temperature and barometric pressure. When used in commercial or general aviation, local temperature may be easily measured and aircraft may correct for barometric variations by securing current barometric readings from local airport transmissions. Obviously, however, military aircraft operating in hostile or enemy territory cannot expect to obtain or depend on reliable barometric information from local airports in the hostile territory.

There is therefore a need in the art for a high accuracy system and method for determining aircraft altitude without use of a substantially continuous radar beam, or reliance upon local airports to provide current barometric pressure information.

SUMMARY OF THE INVENTION

It is therefore an object of the invention to provide a reliable and accurate system and method for measuring the altitude above ground level (AGL) of a military aircraft operating over hostile terrain.

It is a more specific object of the invention to provide a system and method for measuring the altitude above ground level of an operating over terrain without using a substantially continuous radar or other reflected beam.

Briefly stated, the invention is directed to a system and method for providing highly accurate measurements of the altitude above ground level of an in-flight aircraft. The invention preferably employs Global Positioning System ("GPS") data and/or Inertial Reference System ("IRS") data for determining the current location—i.e. the latitude and longitude coordinates—of the aircraft. With this two-dimensional data, and reference to a topographical map or database or other source of ground elevations of the terrain over which the aircraft is positioned or proximate to the flying aircraft, the MSL elevation of the currently-overflown local terrain can be determined. The AGL altitude of the aircraft is established by emitting toward the local terrain a single short-duration signal pulse from the aircraft and receiving a return signal reflected back from the terrain, and measuring the period of reflection as an indicator of aircraft AGL altitude of the aircraft above the terrain. The MSL altitude of the aircraft is then calculated from the sum of the MSL elevation of the terrain and the AGL altitude of the aircraft. The aircraft may then compare the calculated sum to its estimated MSL altitude, determined using its standard static air pressure measurements, to calculate a barometric correction factor that will render its conventional altimeter accurate. Specifically, a local barometric correction factor is derived from the difference of the calculated and estimated MSL altitude measurements and that correction factor is then used to monitor the MSL altitude of the aircraft as it continues flight over the local terrain without having to emit signal pulses until the aircraft flies to another, widely-separated locator over the terrain.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE CURRENTLY PREFERRED EMBODIMENTS

Figure 1:
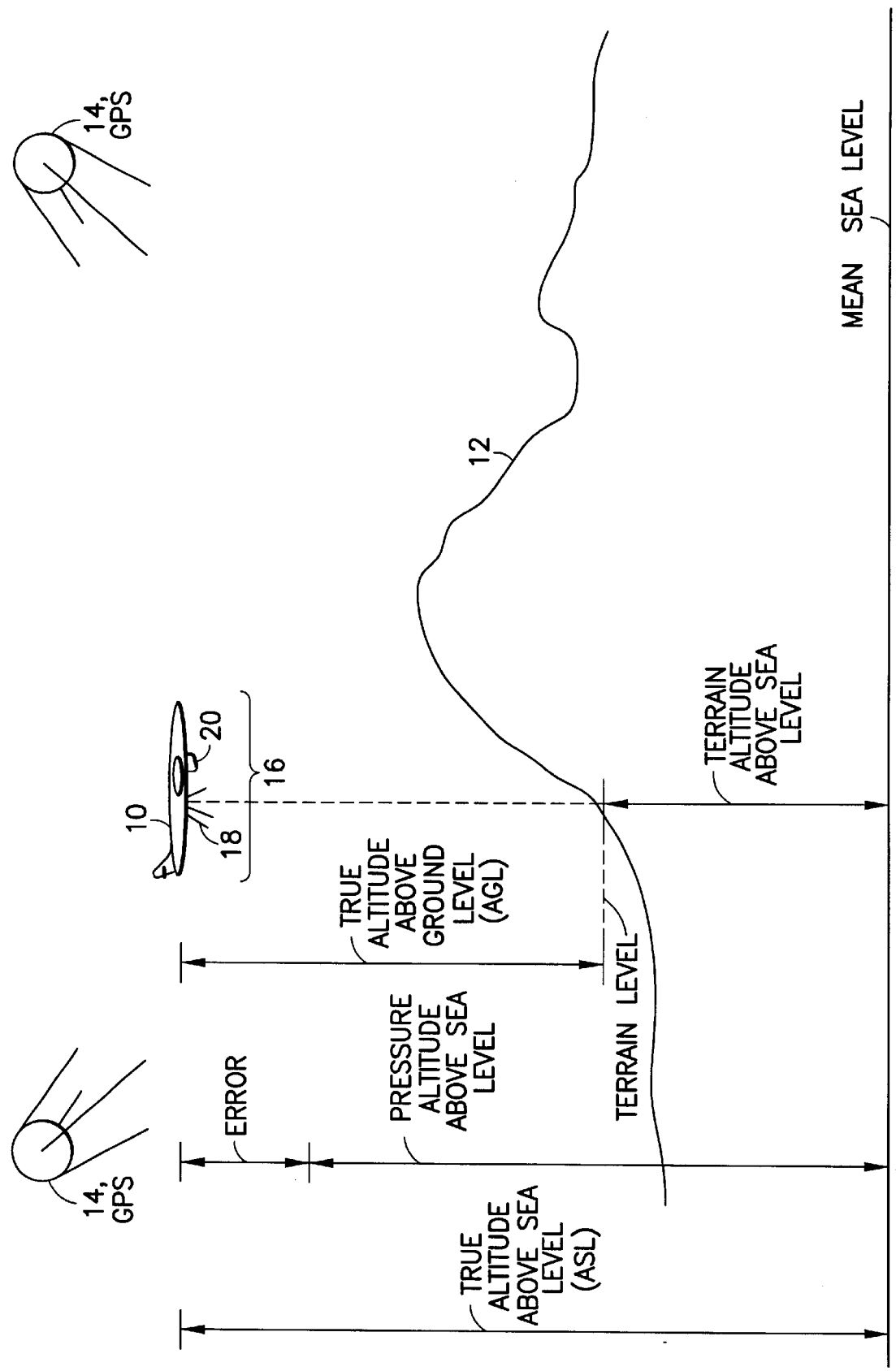
FIG. 1 is a schematic diagram showing the spatial relationships of an aircraft flying over terrain in accordance with the invention.

FIG. 1 depicts an aircraft 10 in flight over terrain 12. For purposes of discussion it is presumed that aircraft 10 is a military aircraft flying over hostile terrain. The invention is nevertheless equally operable in other situations, and the invention and its application should not therefore be construed as being limited to a military aircraft.

When flying over hostile terrain, highly accurate altitude measurement is crucial. While the use of known radar altimeters provides a highly reliable method of determining altitude, such use is easily detectable and, therefore, undesirable. To compensate or minimize this drawback, it is customary for a military aircraft to reduce the generation of radio frequency (RF) waves emitted from such altimeters.

Altitude is typically measured relative to a constant or static air pressure value sensed at the exterior skin of the aircraft. The actual air pressure about an aircraft, however, is not only affected by altitude but also by air temperature and local barometric variances. The aircraft contains instrumentation to easily measure the air temperature at the aircraft exterior, but barometric information is generally obtained, in non-hostile environments, from local airports which monitor this data on a continuous basis. In a hostile environment, of course, this data is either not available or its integrity is questionable (e.g., an enemy airport transmitting false barometric information, etc.)

In FIG. 1, aircraft 10 is illustrated over local terrain 12 at an altitude above ground level ("AGL"). The mean sea level (MSL) elevation of the aircraft is the sum of the AGL altitude of the aircraft and the MSL altitude of the local terrain, i.e. the terrain currently proximate the aircraft, generally directly below the aircraft. Those skilled in the art will recognize that the invention can similarly be applied in connection with terrain that is angularly positioned below the aircraft—i.e. at an angle other than directly below the aircraft. It is assumed that the elevation of the terrain over which the aircraft is position identified by the latitude and longitude of the aircraft, is known or can be quickly derived from the available topographical maps of the terrain or databases or other sources of terrain elevation information.

The latitude and longitude coordinates may for example be ascertained by accessing the broadcast satellites of a Global Positioning System ("GPS") 14, and the topographical information for terrain elevation may be stored in an on-board database in aircraft 10. This leaves the flight crew with only a single source of significant error in its calculation of the aircraft's current AGL altitude, namely the barometric error—i.e. errors resulting from local variation in barometric pressure.

Aircraft 10 is equipped with a radar altimeter 16, which comprises a radar transmitter 18 and a radar reflections receiver 20. While continuous use of radar altimeter 16 is unsafe due to the detection drawbacks discussed above, it may be used briefly without unduly exposing aircraft 10 to the possibility of detection. In accordance with to the inventive method and system, aircraft 10 activates radar altimeter 16 at brief intervals separated by long inactive intervals of considerable time or distance, e.g., activated for as little as one second every approximately ten minutes or thirty kilometers. This short duration single activation of the radar is insufficient to permit ready location or detection of the aircraft by hostile forces. The brief radar activation is nevertheless sufficient to permit radar altimeter 16 to determine the true AGL altitude of the aircraft at the point or location of the measurement. This is accomplished, as is known in the art, by directing an RF signal from the aircraft to the local terrain and receiving the returned reflected-back signal at the aircraft. The time period of the reflection of the transmitted signal is a calculatable indication of the distance between the transmitting aircraft and the reflecting terrain point. The transmitted signal can be directed substantially perpendicularly downward toward the immediately underlying local terrain, i.e. toward the terrain directly below the aircraft as is preferred, or may be directed at an angle to the locally proximate terrain, in which case known mathematics may be used to calculate the actual AGL altitude of the aircraft relative to that terrain location. This calculated AGL altitude is then used, in accordance with the present invention, to calculate the barometric correction factor, as hereinbelow described.

Figure 2:
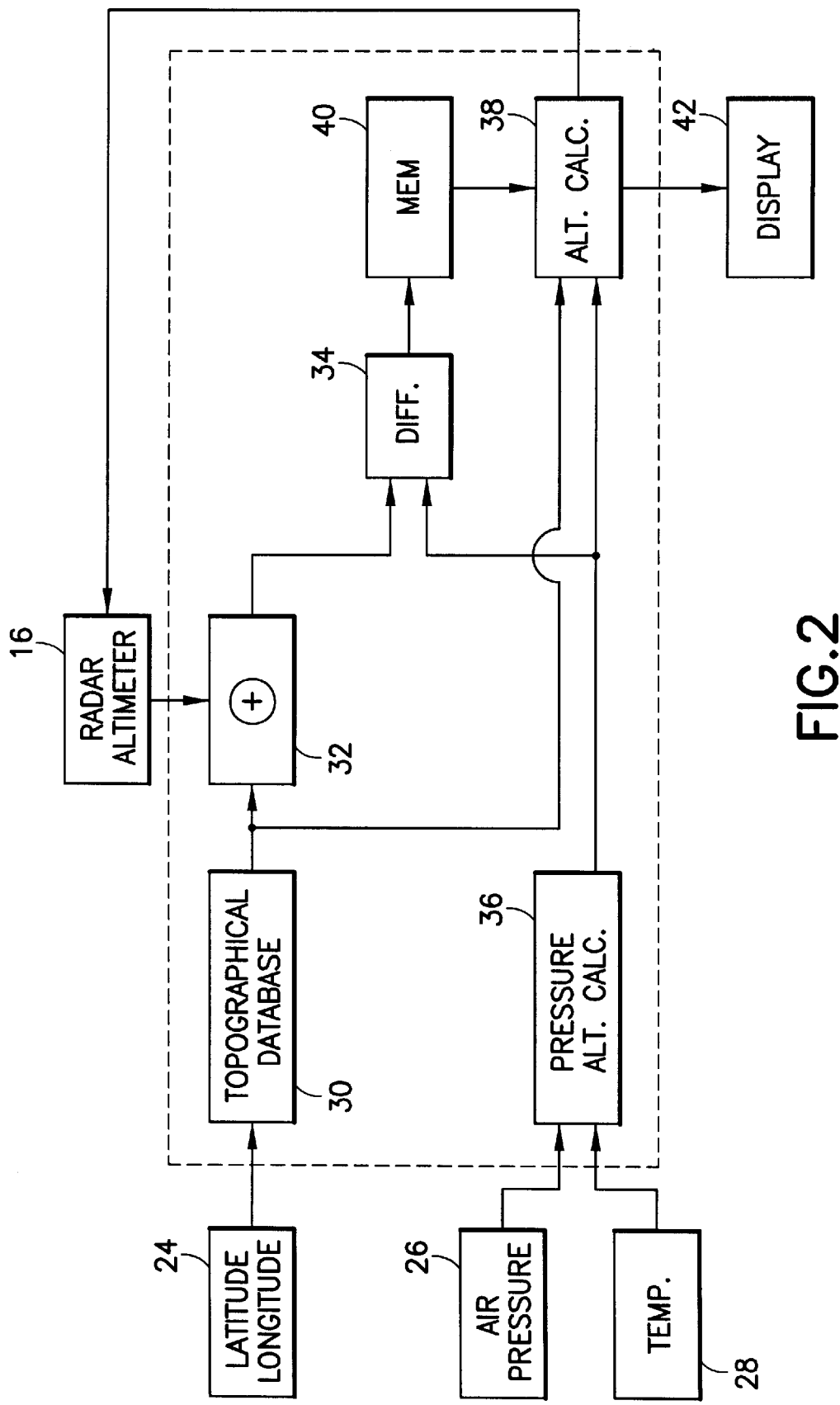
FIG. 2 is a block diagram depicting the components of the inventive system.

With reference to FIG. 2, an air data computer (ADC) 22 receives inputs from radar altimeter 16, an aircraft position (e.g. latitude/longitude) determining means 24, air pressure measurement sensor or system 26 and a temperature sensor 28. Latitude/longitude determining means 24 sends a signal indicative of the current geographical position of aircraft 10 to a topographical database 30 contained within or forming a part of ADC 22. Topographical database 30 contains known information about the MSL elevation for the local terrain, since such information is widely available for if not most, of the world. In an alternate embodiment, topographical database 30 may be located externally or separately of ADC 22, and may for example be a CD-ROM reader in which a CD-ROM containing the relevant topographical information is stored.

In any event, topographical database 30 is operable to output a signal indicative of the MSL elevation of the terrain over which aircraft 10 is in flight. This signal, along with an output from radar altimeter 16 indicative of the radar-determined AGL altitude of aircraft 10 is combined—generally summed—at an adder 32 which outputs a signal representative of the true MSL altitude of the aircraft. The resulting signal is provided to an input of a differentiator 34.

Air pressure data from the aircraft's conventional air pressure measurement sensor or system 26 and a temperature indicative input or measurement from the temperature sensor 28 are input to a pressure altitude calculator 36, which determines the temperature* corrected pressure altitude in known fashion, and which may include means for storing information such as the static source error correction (SSEC) for aircraft 10, so that the determination of pressure altitude is as accurate as possible, with the exception of the required barometric pressure correction factor. A signal representative of the temperature-corrected pressure altitude is provided to a second input of differentiator 34, and to an altitude calculator 38 which receives the terrain MSL elevation from topographical database 30.

Differentiator 34 calculates the difference between (1) the true aircraft MSL altitude from adder 32 at a time t substantially concurrent with the activation of the radar altimeter 16, and (2) the temperature-corrected MSL pressure altitude from pressure altitude calculating means 36 at time t. This differential signal represents the required local barometric correction factor, and is sent to a memory 40 where it is stored for reference by an altitude calculator 38. Once the differential signal is determined, the AGL altitude of the aircraft is output to a display 42 for reference by the flight crew.

The inventive method of determining the aircraft AGL altitude of the aircraft may be understood by reference to the structure of FIG. 2 and will now be discussed. As aircraft 10 travels over local terrain 12, it does not start out with an accurate indicator of its AGL altitude because the local barometric pressure is not known. Thus, the aircraft's standard altimeter, whether set to calculate MSL altitude based on standard temperature and pressure (i.e. 29.92 in/Hg) or some other value previously in use, cannot be expected to—and most likely does not—indicate the aircraft's actual MSL altitude. To initiate the required barometric pressure correction, radar altimeter 16 is activated briefly, preferably for no more than about one second. On receipt of the terrain-reflected signal by radar receiver 20 (FIG. 1), radar altimeter 16 generates, in known fashion, a signal indicative of the current AGL altitude of the aircraft which signal is input to adder 32. At the same time, to determine the MSL altitude of the same local terrain ADC 22 collects data reflecting the latitude and longitude of aircraft 10 at that point in time from latitude/longitude determining means 24 and, using that data, accesses topographical database 30 to gather the data that identifies the known MSL elevation of that local terrain. This MSL elevation of the terrain is input to adder 32 for calculating the true MSL altitude of the aircraft as the sum of the known terrain MSL elevation and the aircraft AGL altitude as determined from the reflected radar altimeter signal.

Concurrent with the calculation of the latitude and longitude coordinates of the local terrain, the pressure altitude calculator 36 calculates the temperature-corrected MSL pressure altitude for the aircraft from the static air pressure at the exterior skin of aircraft 10, the air pressure measurement means 26, the temperature as detected by temperature sensor 28 and the-known SSEC for aircraft 10 which may be stored in pressure altitude calculator 36. This calculated MSL pressure altitude of the aircraft will be accurate except for the required barometric correction factor.

Differentiator 34 may then determine the local barometric correction as the difference of the true MSL altitude of the aircraft (from adder 32) and the calculated MSL altitude of the aircraft (from pressure altitude calculator 36). This calculated barometric correction may then be stored in memory 40 and supplied to altitude calculator 38 for continued use in calculating the MSL altitude of the aircraft as it continues along on its flight without further use or engagement of radar altimeter 16. The corrected MSL and AGL altitude of the aircraft may then be reliably displayed for the flight crew on e.g. cockpit display 42.

Of course, the local barometric correction factor is not constant over time or distance, since local barometric pressure varies, and must therefore be updated from time to time. This update may be performed by periodic activation of radar altimeter 16 by altitude calculator 38 in accordance with the inventive method. These activations may be carried out at intervals based on time, such as every 30 minutes, or on a distance or geographic basis, such as every 30 kilometers, or otherwise based on detected changes in weather or atmospheric conditions or anticipated or expected local barometric pressure gradients. It is well within the skill of those of ordinary skill in the art to select a suitable sampling period based upon measured barometric gradients. If the observed barometric gradient is steep, then sampling should be done more frequently than when the barometric gradient is more gradual. In this way, the exposure of aircraft 10 to hostile detection is minimized, since the generation of radar signals is so infrequent.

The Inertial Reference System ("IRS") of aircraft 10 can be used as a secondary reference of the aircraft's position and in determining the pressure of isobars and local barometric pressure gradients. Comparing detected changes in inertial height to the current aircraft MSL altitude as indicated by conventional instruments, as for example the aircraft's static pressure based altimeter indicating system, ADC 22 may monitor the integrity of the displayed aircraft AGL altitude and determine when a further radar altimeter measurement in accordance with the invention is needed. Recursive corrective algorithms, such as Kalman filters, can be employed to determine the optimum intervals for repeated radar altimeter measurements, based upon the geographic position of aircraft 10, topological data of the terrain, the speed of aircraft 10, and the AGL altitude of the aircraft.

In an alternate embodiment of the invention, an augmented GPS signal may be employed to provide both the current geographic (i.e. latitude/longitude) position of the aircraft and the current altitude of the aircraft—more particularly, the GPS-determined distance of the aircraft from the center of the earth, which is then converted (typically by the GPS receiver system software) into the aircraft's current MSL altitude. The normal GPS signal, which is of insufficient accuracy for use in identifying the altitude or elevation of the GPS receiver of the aircraft with a precision sufficient to support reliance on that determination alone for flying an aircraft over hostile terrain, may be augmented in any suitable way to increase the accuracy and precision of the resulting altitude determination, such by way of currently preferred example using wide area augmentation (WAA) or differential correction. Such GPS augmentation techniques are well known to those of ordinary skill in the art. The resulting augmented GPS-determined current MSL altitude of the aircraft is then compared with the uncorrected MSL altitude determination provided by the aircraft's conventional altitude-monitoring instrumentation, based upon readings from the air pressure measurement sensor or system, to yield an altitude error from which the required barometric pressure correction factor is calculated. That correction factor is thereafter used to provide, through the aircraft's conventional altitude-monitoring instrumentation, highly accurate continuously-updated MSL altitude indications for the aircraft and, in conjunction with the known MSL elevation of the local terrain over which the aircraft is flying—the local terrain location being identified by the GPS-provided geographical latitude/longitude information for the aircraft—highly accurate continuously-updated AGL altitude indications for the aircraft.

It is also contemplated that this alternative method and arrangement for determining the current MSL altitude of the aircraft using augmented GPS-based altitude or elevation information may be used in conjunction with, rather than simply in place of, a radar altimeter transmission and timed return of its reflection from the local terrain to thereby further enhance the accuracy and integrity of the resulting determination of the aircraft's MSL altitude and, through further comparison and calculation, the appropriate barometric pressure correction to be applied to the aircraft's conventional, static air pressure-based altitude monitoring system.

The present invention accordingly provides methods and apparatus for determining the required barometric pressure correction factor, for use by an aircraft's conventional static air pressure-based altitude indicating system, where local barometric pressure readings cannot be obtained, as for example in hostile terrain locations or other areas in which use of a conventional radar altimeter to obtain continuously updated AGL altitudes of the aircraft is unavailable or impractical or presents an unacceptable risk to the aircraft. In its broadest aspects, the inventive methods and apparatus identify the current geographic (i.e. latitude/longitude) position of the aircraft over a local terrain location. The MSL altitude of the aircraft is then identified with a high degree of accuracy without reference to the static air pressure at the exterior skin of the aircraft, upon which continuous altitude determinations for an aircraft in flight are conventionally based. This highly accurate identification of current MSL altitude may be made, in accordance with the invention, using either of two methods, or a combination thereof. In the first, AGL altitude of the aircraft over a current local terrain location is determined with high accuracy by timed reflection of a single brief transmission from a radar altimeter (or, indeed, any reflectable signal, whether electromagnetic or optical); that determined AGL altitude is then added to the known MSL elevation of the current local terrain location, which location has been identified from GPS signals or otherwise, to provide a highly accurate MSL altitude determination for the aircraft. In the second method, augmented GPS signals are employed to directly provide the current MSL altitude of the aircraft over the current local terrain location. Using either (or both) of these methods, the resulting highly accurate MSL altitude of the aircraft is then compared to the uncorrected MSL altitude that is available using the aircraft's conventional static air pressure based altitude indicating system, and the required barometric correction factor is calculated from the results of that comparison. The aircraft can then continue its flight away from the local terrain location over which the foregoing determinations were made without the need to recalibrate (i.e. determine and apply a new barometric correction factor to) the static air pressure based altitude indicating system for a considerable time and/or distance of flight as a function of the pressure gradients and other atmospheric conditions through which the aircraft is travelling or that it encounters on its continued flight. If desired, the augmented GPS signal and methodology may be employed between the widely-separated single, brief signal transmissions from the radar altimeter to continue to confirm the accuracy of the previously-calculated barometric pressure correction without unintendedly revealing, through the use of additional transmitted radar altimeter signals, the presence or location of the aircraft to hostile forces or the like.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a barometric pressure corrected above mean sea level (MSL) altitude of an in-flight aircraft over terrain, comprising the steps of:

calculating a current above ground level (AGL) altitude of the aircraft by generating a single brief transmission from the aircraft directed onto local terrain over which the aircraft is currently flying and receiving at the aircraft a return reflection of the transmission;

identifying the current local terrain using then-current position coordinates of the aircraft, and determining a known MSL elevation of the identified local terrain using a source of stored terrain elevation data;

calculating an actual MSL altitude of the aircraft from the calculated AGL altitude of the aircraft and the identified MSL elevation of the local terrain;

determining an uncorrected MSL altitude estimate of the aircraft from static air pressure measurement;

calculating a local barometric correction factor for the identified local terrain from the difference of said calculated actual MSL altitude of the aircraft and said determined MSL altitude estimate of the aircraft; and using the calculated correction factor in conjunction with continued measurement of static air pressure to determine the barometric pressure corrected MSL altitude of the in-flight aircraft proximate the identified local terrain and continuously as the aircraft proceeds in flight away from the local terrain.

2. The method of claim 1, further comprising the step of calculating, on a continuing basis after said calculating of the local barometric correction factor, the AGL altitude of the aircraft above terrain over which the aircraft is positioned as the aircraft continues in flight away from the identified local terrain by using the determined MSL altitude of the in-flight aircraft in conjunction with continued identification of newly-current position coordinates of the aircraft and the source of terrain elevation data.

3. The method of claim 1, wherein said RF transmission is a radar transmission.

4. The method of claim 3, wherein said RF transmission is a radar transmission.

5. The method of claim 1, wherein the aircraft position coordinates comprise latitude and longitude coordinates of the aircraft as determined by a Global Positioning System.

6. The method of claim 5, wherein the latitude and longitude coordinates of the aircraft are determined by inertial navigation.

7. The method of claim 1, wherein said MSL altitude of the local terrain is determined by reference to an on-board database containing values of terrain elevations.

8. The method of claim 1, wherein said step of determining an uncorrected MSL altitude estimate of the aircraft uses a temperature-corrected static air pressure measurement.

9. The method of claim 1, wherein said step of calculating an actual MSL elevation comprises adding the calculated AGL altitude of the aircraft and the identified MSL altitude of the local terrain.

10. The method of claim 1, wherein said brief transmission is no greater than about one second in duration.

11. A system for determining an above mean sea level (MSL) altitude of an in-flight aircraft over terrain, comprising:

means for calculating a current above ground level (AGL) altitude of the aircraft by generating a single brief transmission from the aircraft directed onto local terrain over which the aircraft is currently flying and receiving at the aircraft a return reflection of the transmission;

means for identifying the current local terrain using then-current position coordinates of the aircraft, and for determining a known MSL elevation of the identified local terrain using a source of stored terrain elevation data;

means for calculating an actual MSL altitude of the aircraft from the calculated AGL altitude of the aircraft and the identified MSL elevation of the local terrain;

means for determining an uncorrected MSL altitude estimate of the aircraft from static air pressure measurement; and means for calculating a local barometric correction factor for the identified local terrain from the difference of the calculated actual MSL altitude of the aircraft and the determined MSL altitude estimate of the aircraft, wherein the calculated correction factor is used in conjunction with continued measurement of static air pressure to determine the MSL altitude of the in-flight aircraft proximate the identified local terrain and as the aircraft continues in flight away from the identified local terrain.

12. The system of claim 11, wherein said brief transmission is an RF transmission.

13. The system of claim 12, wherein said RF transmission is a radar transmission.

14. The system of claim 11, wherein the aircraft position coordinates comprise latitude and longitude coordinates of the aircraft as determined by a Global Positioning System.

15. The system of claim 14, wherein the latitude and longitude coordinates of the aircraft are determined by inertial navigation.

16. A method for determining a barometric pressure corrected above mean sea level (MSL) altitude of an in-flight aircraft over terrain, comprising the steps of:

identifying a current local terrain location over which the aircraft is currently in flight using a GPS receiver on the aircraft;

identifying an actual current MSL altitude of the aircraft over the current local terrain location using an altitude determining means not based on static air pressure measurement proximate the aircraft;

determining an uncorrected current MSL altitude of the aircraft over the current local terrain location using a static air pressure measurement proximate the in-flight aircraft;

calculating a difference between the identified actual current MSL altitude and the determined uncorrected current MSL altitude and calculating a local barometric correction factor for the current local terrain location using the calculated difference;

using the calculated correction factor in conjunction with continued measurement of static air pressure to determine the barometric pressure corrected MSL altitude of the in-flight aircraft proximate the local terrain and continuously as the aircraft proceeds in flight away from the local terrain.

17. The method of claim 16, wherein said step of identifying an actual current MSL altitude of the aircraft comprises identifying the actual current MSL altitude using augmented GPS to provide the actual current MSL altitude of the aircraft over the current local terrain location.

18. The method of claim 16, wherein said step of identifying an actual current MSL altitude of the aircraft comprises the steps of:

calculating a current above ground level (AGL) altitude of the aircraft by generating a single brief signal transmission from the aircraft directed onto the current local terrain location and receiving at the aircraft a return reflection of the transmitted signal;

determining a known MSL elevation of the current local terrain location using a source of stored local terrain elevation data; and calculating the actual current MSL altitude of the aircraft over the current local terrain location by adding the calculated current AGL altitude of the aircraft and the determined MSL elevation of the current local terrain location.

19. The method of claim 16, wherein said step of identifying an actual current MSL altitude of the aircraft comprises the steps of:

calculating a current above ground level (AGL) altitude of the aircraft by using a radar altimeter of the aircraft for generating a single brief signal transmission from the aircraft directed onto the current local terrain location and receiving at the aircraft a return reflection of the transmitted signal;

determining a known MSL elevation of the current local terrain location using a source of stored local terrain elevation data; and calculating the actual current MSL altitude of the aircraft over the current local terrain location by adding the calculated current AGL altitude of the aircraft and the determined MSL elevation of the current local terrain location.

* * * * *